Dec. 29, 1964     J. E. ADAMS     3,163,391
CAPACITOR CLIP
Filed June 15, 1962

INVENTOR.
JAMES E. ADAMS
BY
Malcolm W. Fraser
ATTORNEY

United States Patent Office 3,163,391
Patented Dec. 29, 1964

3,163,391
CAPACITOR CLIP
James E. Adams, Toledo, Ohio, assignor to The Bishop and Babcock Corporation, Toledo, Ohio, a corporation of Ohio
Filed June 15, 1962, Ser. No. 203,129
2 Claims. (Cl. 248—223)

This invention relates to sheet metal fasteners, but more particularly to spring metal clips for supporting a condenser, capacitor or the like upon a supporting panel.

In the U.S. patents to H. W. Kost No. 2,494,881 of January 17, 1950 and G. V. Peck No. 2,541,828 of February 13, 1951, capacitor or condenser mounting clips are shown embodying a pair of outwardly bowed gripping members which are attached in various ways to supporting panels. Most of these attaching means are too expensive and involve structural changes in the supporting plates which are objectionable. It is a desideratum to provide a simple and inexpensive mounting for these clips which requires a single hole in the supporting plate and is such that the inherent structure of the clip when in applied position securely retains the fastener in place.

An object is to produce such clip which can be readily applied to a mounting plate formed with a single hole for such purpose.

Figure 1:
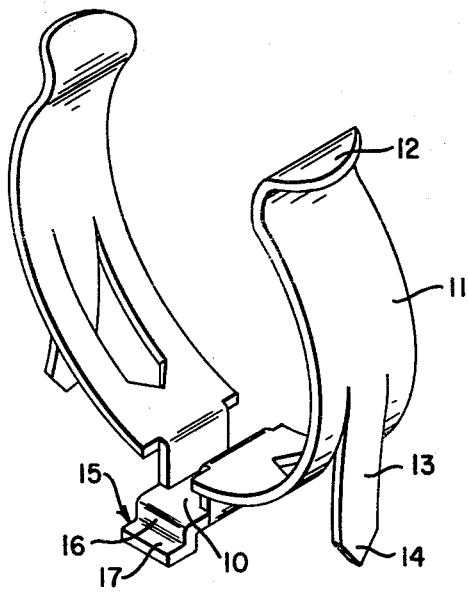
Figure 2:
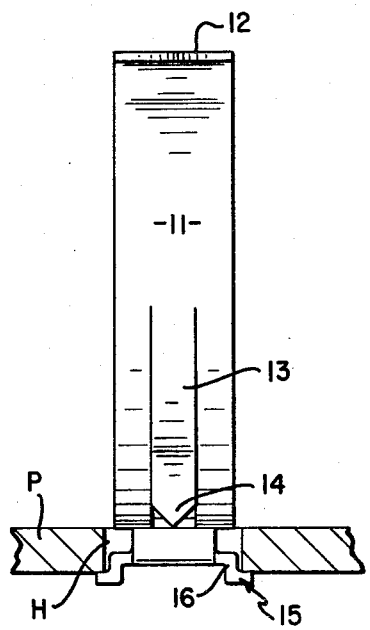
Figure 3:
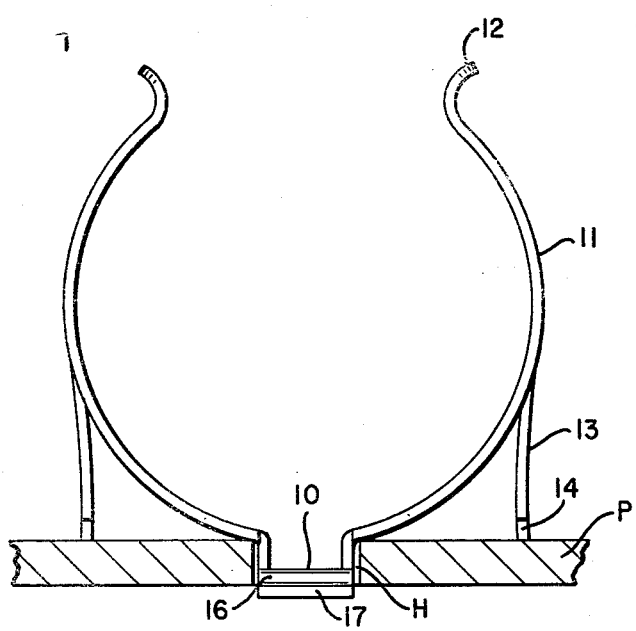

Other objects and advantages of the invention will hereinafter appear, and, for purposes of illustration, but not of limitation, an embodiment of the invention is shown on the accompanying drawings in which FIGURE 1 is a perspective view of a spring metal clip embodying the present invention;

FIGURE 2 is an edge elevation of the clip shown on FIGURE 1 mounted on a supporting panel or mounting plate, the latter being shown in fragmentary section; and FIGURE 3 is a view similar to FIGURE 2 but viewing the clip in side elevation.

It will be understood that a spring clip of this type is useful particularly in the radio, electrical, or automotive arts where elements such as capacitors, condensers, resistors, or fuses are employed. Such elements are generally cylindrical in shape and are such as may be readily removed and replaced as desired. As will hereinafter appear a single opening is required in the mounting plate for connecting the clip in place, and thus a number of holes may be provided in the mounting plate to accommodate a number of clips of this design.

The illustrated embodiment of the invention comprises a one piece spring metal clip having a flat base 10 of generally rectangular shape and from the opposite sides of the base are upwardly extending gripping members 11, one being disposed on each side of the base and each gripping member being outwardly bowed or of a conformation to grip a cylindrical element, such as a capacitor. It will be observed that the upper end portions of the outwardly bowed gripping members 11 are spaced from each other and, as shown, the ends are outwardly curved, as indicated at 12, providing portions which can be grasped by the fingers so as to press the two end portions toward each other for a purpose which will hereinafter appear.

Struck from each of the arms or gripping members 11 are fingers 13. Each finger 13 is bent outwardly and is relatively straight from end to end. Each finger 13 is disposed in a plane normal to the base 10, and the free end of each finger 13 is provided with a point 14 for positive impingement against a mounting plate when the clip is fixed into position. At the opposite ends of the base 10 are stepped feet 15. Each foot 15 comprises a vertical downwardly extending shoulder portion 16 and a horizontal terminal portion 17 projecting outwardly at approximately right angles to the shoulder portion 16.

The spring metal clip above described is for mounting in a single aperture or hole H in a mounting plate or panel P. The hole H in this instance is of oblong shape and has one dimension which is slightly greater than the space between the shoulder portions 16, so that the latter may abut against the edge of the hole H, as indicated on FIGURE 2. The horizontally disposed terminal portions 17 underlie the inner face of the panel P as shown.

In order to install the clips on the mounting plate P, the finger pieces 12 are grasped and moved toward each other, thereby to rock the fingers 13 inwardly and away from the outer face of the mounting plate P. Then by a tilting movement, first one of the feet 15 is passed through the hole H until the other foot is permitted to enter, whereupon the clip is returned to an upright position with the feet 15 in the position shown in FIGURE 2. Thereafter by releasing the finger pieces 12, the pointed ends 14 of the fingers 13 impinge against the outer face of the mounting plate P. The length of the fingers 13 is so chosen that when the pointed ends 14 engage the mounting plate P, a certain amount of tension is exerted on the fastener to press the portions 17 of the feet against the inner face of the mounting plate. Thus it will appear that the clip is securely held in position against rattles and vibration due to the spring tension imposed on the feet 15 which urges them firmly against the mounting plate P. The structure is such however that the clip can be readily and conveniently removed from the mounting plate when that is desired.

The placing of a capacitor or condenser between the outwardly bowed arms or gripping members 11 operates to spread the arms 11 and further increases the tension imposed on the fingers 13. Thus outward pressure against the gripping members 11 increases the tension on the fingers 13 and urges the feet 15 into more intimate engagement with the inner face of the mounting plate.

Numerous changes in details of construction, arrangement and choice of materials may be effected without departing from the spirit of the invention, especially as defined in the appended claims.

What I claim is:

1. In combination, a mounting plate having inner and outer faces and having a single fastener-receiving opening, and a one-piece clip mounted in said plate at said opening, said clip comprising a base disposed transversely of the clip and having at opposite ends stepped feet extending through said opening and engaging the edge portion of the opening on the inner face of the plate, a pair of resilient flexible gripping members connected to the opposite sides of the base and extending therefrom outwardly away from said outer face of the mounting plate, said members having oppositely bowed portions to receive a supported element between them, and an approximately straight finger struck from each gripping member and the free end thereof extending downwardly for engagement with the outer face of the mounting plate, the structure being such that the gripping members are first flexed toward each other before the feet are engaged in the opening and after the gripping members are released the fingers impinge against the mounting plate for pressing the feet against the inner face of the mounting plate.

2. The organization as claimed in claim 1 in which the base has a longitudinal dimension slightly less than that of the opening in the mounting plate, and each stepped foot comprises an integral downwardly extending shoulder adapted to abut against the adjacent edge of the opening, and a lateral outwardly extending terminal portion integral with said shoulder to abut against the inner face of the mounting plate.

References Cited in the file of this patent

UNITED STATES PATENTS

| | | |
|---|---|---|
| 2,166,916 | Lombard | July 18, 1939 |
| 2,469,451 | Burrus | May 10, 1949 |
| 2,494,881 | Kost | Jan. 17, 1950 |
| 2,541,908 | Attwood | Feb. 13, 1951 |
| 2,868,489 | Calcut | Jan. 13, 1959 |
| 2,963,166 | Miller | Dec. 6, 1960 |
| 2,965,874 | Modrey | Dec. 20, 1960 |